FIELD PACK TESTER

INVENTORS:
Richard J. Penny
Charles W. David
Harry A. Riley
By Smyth, Roston & Pavitt
ATTORNEYS

FIELD PACK TESTER

Filed Sept. 15, 1967 2 Sheets-Sheet 2

INVENTORS:
Richard J. Penny
Charles W. David
Harry A. Riley
By Smyth, Roston & Pavitt
ATTORNEYS United States Patent Office 3,509,634
Patented May 5, 1970

3,509,634

FIELD PACK TESTER

Charles W. David, El Segundo, Richard J. Penny, Playa del Rey, and Harry A. Riley, Torrance, Calif., assignors to Disc Pack Corporation, Hawthorne, Calif., a corporation of California Filed Sept. 15, 1967, Ser. No. 668,043
Int. Cl. G01b 5/20
U.S. Cl. 33—174 9 Claims

ABSTRACT OF THE DISCLOSURE

A field pack tested which may include a test stand, a spindle mounted on the test stand for mounting a disc pack for rotation, and a member attachable to the disc pack to facilitate manual rotation of the disc pack on the spindle. Various testing or cleaning devices may be mounted on the test stand. For example, a runout gauge may be suitably mounted on the test stand to check runout of the disc pack while the latter is being manually rotated.

BACKGROUND OF THE INVENTION

A disc pack is a precision device and includes several recording discs appropriately mounted in spaced, parallel, stacked relationship. Each of the recording discs is a thin annular member having a thin coating of magnetic oxide thereon on which a large amount of information can be stored for subsequent use in a data processing machine. Typically, the disc pack is placed on a drive unit and rotated at a predetermined speed during which time the information is retrieved from the disc. These drive units are quite expensive and therefore it is desirable to maintain at a maximum the amount of time that such drive unit is being used for its intended purpose of driving a disc pack.

In order for a recording disc to perform properly, it is imperative that it be very clean and free from lint, dirt, grease, etc. Also the recording disc surfaces must be smooth and flat and the disc must not be warped. Similarly, each recording disc must be carefully mounted on the disc pack so that the surfaces of adjacent recording discs remain parallel and spaced a predetermined amount.

Elaborate equipment is typically utilized at the manufacturer's plant to assure that each disc pack supplied to the trade will be clean and constructed within the requisite tolerances. However, in actual use the disc pack becomes contaminated and therefore, it is often necessary to visually inspect the pack and clean the pack. It addition, the runout, i.e. the deviation of various points on the disc from a predetermined datum plane, must be checked periodically and following each instance in which the disc pack receives an impact blow such as might occur when the pack is dropped.

In conducting these various tests it is necessary that the disc pack be accurately mounted for rotation. Also the disc pack should be suitably mounted to facilitate cleaning thereof. Heretofore, the cleaning operation and these field tests have been run with the pack mounted on the drive unit itself. This is very undesirable because during the time that a drive unit is tied up for testing or cleaning of a disc pack, it cannot be used for its intended purposes. Thus, the drive unit constitutes a very expensive cleaning and test stand.

To test runout with the disc pack mounted on a drive unit, the cover, shroud, and filter assemblies of the drive unit must be removed and a runout gauge is set on the base of the drive unit. Removal of these assemblies of the drive unit increases the time required for the test and the time that the drive unit cannot be operated for its intended purposes. This procedure also involves a certain amount of danger of damaging the disc pack as the gauge is set loosely on the base and is not attached thereto. Thus, if the runout gauge is inadvertently struck by the workman, it may contact one of the delicate recording discs and cause damage thereto. Furthermore, there is nothing on the base to advise the workman of the exact position that the runout gauge should assume relative to the disc pack thereby further increasing the likelihood of contacting the recording discs with the runout gauge.

The drive unit is further not adapted for use as a test stand in that the spindle is recessed thereby providing a dark area which is not suited for a thorough visual inspection of the disc pack. The work areas provided on the drive unit are not spacious and testing of the pack on the drive unit increases the likelihood of damaging the latter. Cleaning of the discs on the drive unit is particularly undesirable because of the likelihood of depositing the various cleaning fluids on the drive unit. Finally, the drive unit does not provide any convenient mechanism for slowly rotating the pack manually. Of course, use of production testing and cleaning equipment of the type used by disc pack manufacturers would be prohibitively costly.

SUMMARY OF THE INVENTION

A primary concept of the present invention is to provide an inexpensive field pack tester on which various disc pack tests and operations can be conducted thereby freeing the drive unit for its intended use and increasing the percent of utilization of the drive unit. With the field pack tester of this invention, the runout test can be conducted much more rapidly than when the pack is mounted on the drive unit because there is no need to remove the top cover assembly and shroud from the drive unit. With the field pack tester of this invention, the pack is not recessed in a darkened area, but rather is fully exposed so that a complete and thorough visual test of the pack can be easily made, and adequate free space surrounding the pack is provided.

In addition to being inexpensive, the field pack tester is preferably compact, lightweight, and portable. Thus, unlike the usual disc pack production equipment, the field pack tester is particularly adapted for use by the disc pack user and can be easily carried manually from place to place.

The invention may be embodied in a field pack tester which includes a test stand and a spindle mounted on the test stand for mounting a disc pack for rotation. Although the particular equipment which is mountable on the test stand can be varied depending upon the type of tests which it is desired to conduct, it is usually desirable to provide means for manually rotating the disc pack. Rotation of the disc pack is, of course, necessary to the conducting of a runout test, and by providing manual means therefor, the tendency of the operator to rotate the disc manually by grabbing portions of the disc pack, which are subject to injury or contamination, is eliminated. Although the manual means for facilitating manual rotation of the disc pack can take any one of several forms, in the preferred embodiment such means includes an apertured plate extending over the cover bezel. If desired, a handle can be attached to, and project axially upwardly from, the apertured plate at a position spaced radially from the rotational axis of the pack.

Perhaps the most frequent test that must be conducted in the field is the runout test. To this end, a runout gauge of conventional design may be provided. According to one form of the invention, such runout gauge is mounted on the test stand to thereby eliminate the danger of inadvertently knocking the gauge against the recording discs and to prevent incorrectly positioning the runout gauge so as to cause the gauge to strike the recording discs. The gauge is movable to facilitate placing of a disc pack on the spindle without interference from the gauge. According to another form of the present invention, the runout gauge is not attached to the test stand. However, in this latter form of the invention, a gauge block is mounted on the test stand for accurately indicating the position in which the runout gauge should be for the test. For example, the gauge block may be a solid block member having a positioning surface and the runout gauge may have a cooperating positioning surface so that upon engaging of the positioning surfaces, the runout gauge will be appropriately positioned relative to the pack for conducting of the test.

It is important that the test stand be rigid and that the portion thereof between the spindle and the runout gauge not be subject to warpage or bending. This is necessary in order that the runout test can be accurately conducted. The test stand should also be of minimum weight and as compact as possible to make the test stand easy to move manually. It should be understood, however, that a fixed field pack tester embodying the principals of this invention could be constructed, if desired.

Another features of this invention is that the field pack tester can be easily disassembled to facilitate manual transport thereof in a suitable carrying case. To this end, the runout gauge is preferably not permanently attached to the test stand and can be easily removed therefrom. The spindle, although attached to the test stand, can be easily disconnected therefrom.

The field pack tester of this invention can also be used for mounting a disc pack for cleaning thereof. The spindle allows rotation of the pack to facilitate the cleaning of the discs and cleaning liquid can contact the field pack tester without causing damage.

The invention, both as to its organization and method of operation together with further features and advantages thereof may best be understood by reference to the following description taken in connection with the accompanying drawings.

DESCRIPTION OF THE PREFERRED EMBODIMENTS

Figure 1:
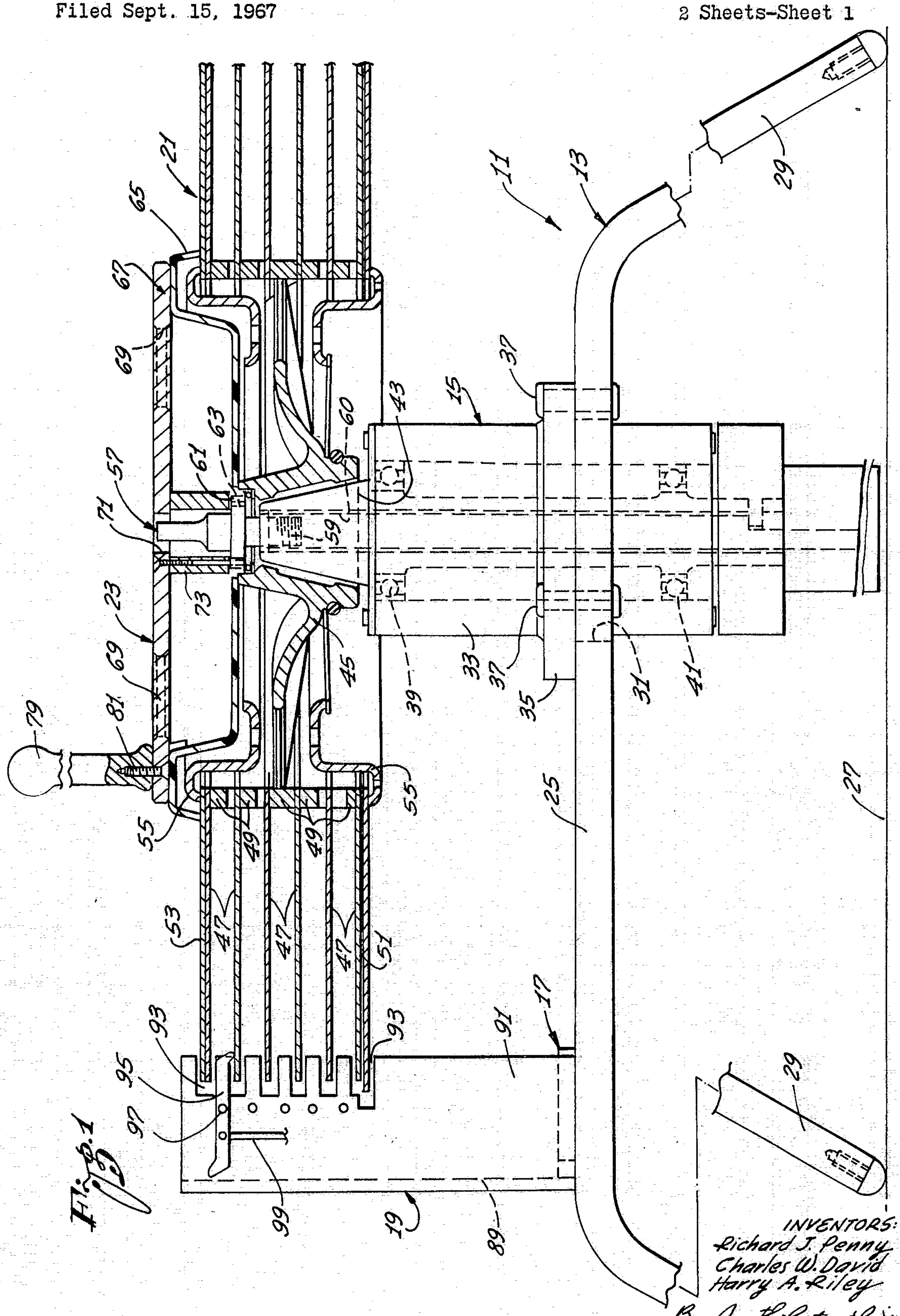
FIG. 1 is a side elevational view partially in section illustrating a field pack tester constructed in accordance with the teachings of this invention with a disc pack mounted thereon.
Figures 2, 3, 4, 5:
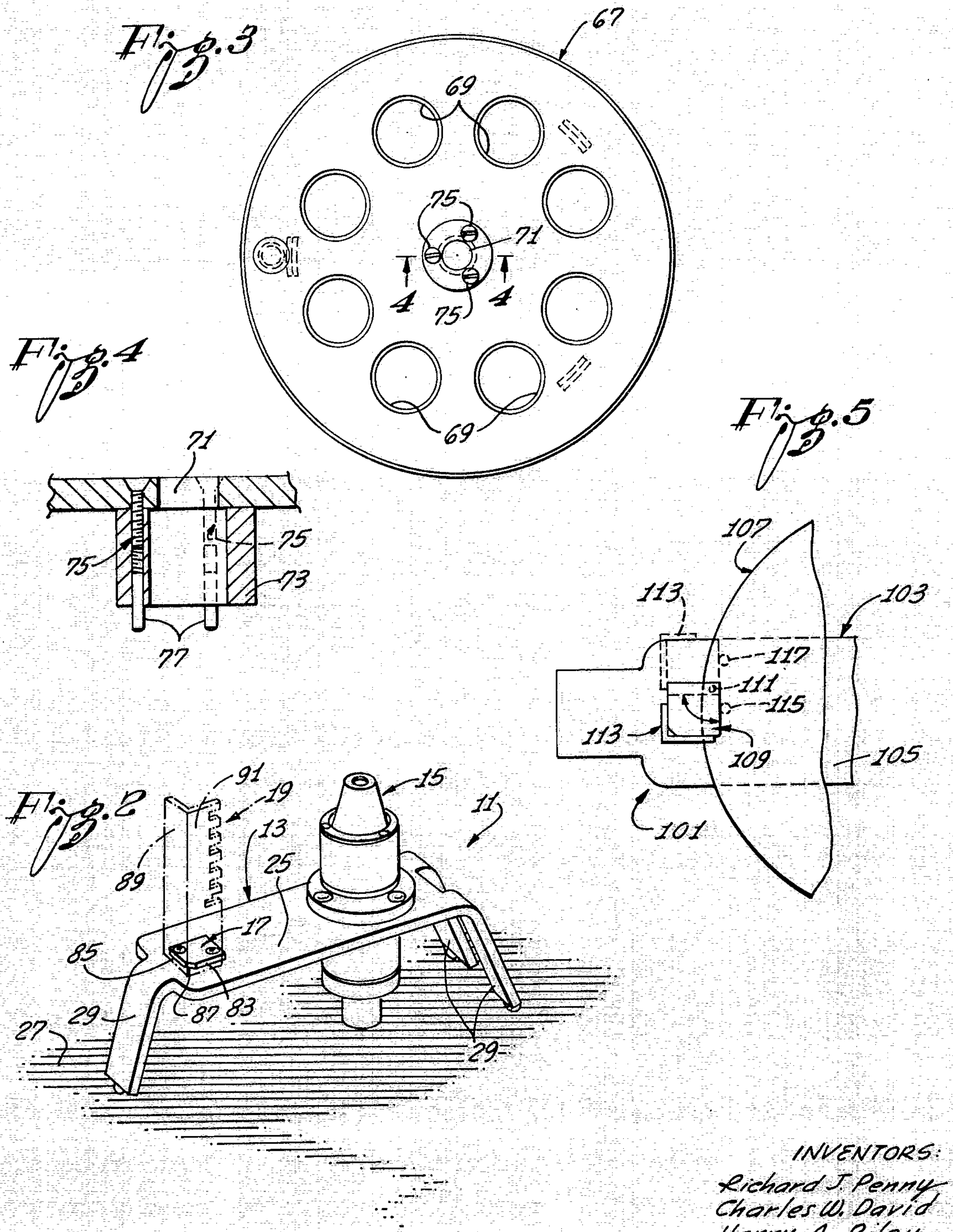
FIG. 2 is a perspective view of the field pack tester with the disc pack removed.
FIG. 3 is a top plan view of the apertured plate member of the field pack tester.
FIG. 4 is an enlarged fragmentary sectional view taken along line 4—4 of FIG. 3.
FIG. 5 is a fragmentary plan view illustrating a second embodiment of the invention.

Referring to the drawings and particularly to FIGS. 1 and 2 thereof, reference numeral 11 designates a field pack tester constructed in accordance with the teachings of this invention. Generally, the field pack tester 11 includes a test stand 13, a spindle 15, a gauge block 17, and a runout gauge 19. A disc pack 21 is mountable on the spindle 15 as shown in FIG. 1. The field pack tester 11 also includes means 23 for facilitating manual rotation of the disc pack 21 on the spindle 15.

The test stand 13 is small, sturdy and preferably constructed of a lightweight metal such as aluminum. The test stand includes a plate member 25 which is supported horizontally above a supporting surface 27 by three legs 29 which are integral with the plate member 25. Integral construction of the test stand 13 is preferred to obviate the possibility of conducting inaccurate tests as a result of looseness of the legs of the test stand. The test stand 13 is portable and may, for example, have an overall length of only about 20 inches, a width of about 6 inches, and be spaced about 4½ inches above the supporting surface 27.

The plate member 25 has an aperture 31 therein through which the spindle 15 projects. The spindle 15 includes an outer casing 33 having a peripheral flange 35 thereon. The casing 33 projects through the aperture 31 in the plate member 25 and the spindle 15 is supported by the flange 35 which rests on the plate member 25 and is attached thereto by a plurality of threaded fasteners 37. The threaded fasteners 37 can easily be disconnected to allow withdrawal of the spindle 15 from the aperture 31. The legs 29 of the test stand 13 are sufficiently long to support the spindle 15 above the supporting surface 27.

The spindle 15 is preferably a standard spindle and includes a pair of bearings 39 mounting a shaft 41 for rotation about a vertical rotational axis. The shaft 41 carries a drive cone 43 at the upper end thereof for supporting the disc pack 21 for rotation.

The disc pack 21 is of conventional construction and accordingly is not explained in detail herein. Briefly, however, the disc pack 21 includes a hub 45 seated on the drive cone 43 and a plurality of recording discs 47 which are maintained in spaced parallel relationship by spacers 49. The recording discs 47, a sector disc 51 and a cover disc 53 are held between clamp rings 55. A lock 57 has a threaded shank portion 59 thereof threaded within a threaded recess 60 in the drive cone 43 to attach and mount the disc pack 21 on the drive cone. The lock 57 also has a peripheral flange 61 having a plurality of axially extending circumferentially spaced apertures 63 therein. A cover bezel 65 forms the uppermost part of the disc pack 21 as the top cover (not shown) has been removed.

The means 23 for facilitating manual rotation of the disc pack 21 includes a circular plate or disc 67 (FIGS. 1, 3 and 4) having a plurality of annularly arranged axially extending apertures 69 extending therethrough. The axes of the apertures 69 are spaced radially from the axis of rotation of the pack 21 and are sized to conveniently receive the fingers of a workman. The plate 67 is preferably wide enough so that the peripheral region thereof rests on an underlying peripheral region of the cover bezel 65. The plate 67 has a central opening 71 into which the upper end of the lock 57 may project as shown in FIG. 1. Surrounding the central opening 71 and depending therefrom is a collar 73 which can best be seen in FIG. 4. The collar 73 may be attached to the plate 67 by a plurality of screws 75 having lower end portions 77 which project beneath the lower end of the collar 73. These lower end portions 77 of the screws 75 are received within the apertures 63 of the lock 57 to drivingly interconnect the plate 67 and the disc pack 21 for rotational movement. To permit rapid removal of the plate 67 from the disc pack 21, it is preferred that the lower end portions 77 of the screws 75 be retained in the apertures 61 only by gravity.

If desired, the means 23 may also include a handle 79. In the embodiment illustrated, the handle 79 extends axially upwardly from the plate 67 and is spaced radially from the axis of rotation of the disc pack 21. A screw 81 is used to attach the handle 79 to a peripheral portion of the plate 67. Thus, in the embodiment illustrated, the disc pack 21 may be manually rotated utilizing the plate 67 of the handle 79.

The gauge block 17 is a small plate-like member that is suitably attached to the plate member 25 at a position which is spaced a predetermined amount from the rotational axis of the disc pack 21. The gauge block 17 has two vertical, perpendicular positioning surfaces or positioning shoulders 83 and 85 (FIG. 2) which are joined by an oblique marking surface 87.

The primary purpose of the gauge block 17 is to provide the positioning surfaces 83 and 85 for the purpose of accurately marking the position at which the runout gauge 19 should be positioned. An oblique marking surface 87 lies in between the positioning surfaces 83 and 85 and provides an indication as to which sides of the gauge block 17 perform the positioning function.

The runout gauge 19 is of conventional design and includes an integral angle member having two perpendicular legs 89 and 91. The leg 91 has a plurality of notches 93 formed therein, each of which receives one of the discs 47. Follower means in the form of a finger 95 is pivotally mounted on a pin 97 on the leg 91. The finger 95 rides along the upper surface of one of the discs 47 as the disc pack 21 is being manually rotated and any deviation in the elevation of such surface causes the finger 95 to pivot. Such pivotal movement of the finger 95 imparts movement to a shaft 99 which is secured to the finger and which leads to a suitable system for transforming the movement of the shaft 99 into suitable visual readings of the runout. For example, the shaft 99 may be suitably mechanically connected to a pointer on a dial for providing runout readings.

The lower interior surfaces of the legs 89 and 91 constitute positioning surfaces on the runout gauge 19. By contacting these positioning surfaces of the runout gauge 19 with the positioning surfaces 83 and 85 of the gauge block 17, the runout gauge is appropriately positioned relative to the disc pack 21 for conducting the runout test. In this form of the invention, the runout gauge 19 is not attached to the gauge block 17 or to the test stand 13, and therefore can be quickly positioned for use in conducting a runout test.

To mount a disc pack on the field pack tester 11, the runout gauge 19 should first be removed from the test stand 13. Next, the top and bottom covers should be removed from the disc pack and the disc pack placed on the drive cone 43 as shown in FIG. 1. The disc pack is then rotated to turn the shank 59 into the threaded recess 60 in the drive cone. The disc pack 21 is now mounted for rotation on the spindle 15 about a vertical rotational axis.

Next, the plate 67 is drivingly connected to the disc pack 21 by inserting the lower end portions 77 of the screw 75 into the apertures 63 of the lock 57. Utilizing the apertures 69 in the plate 67, the plate 67 can be utilized to slowly rotate the pack 21 on the spindle 15. Such rotation of the pack 21 may be useful in visually inspecting the pack, in cleaning the pack, or in conducting a runout test.

If a runout test is to be conducted, the runout gauge 19 is next positioned on the plate member 25 of the test stand 13 by positioning the lower interior surfaces of the legs 89 and 91 into engagement with the positioning surfaces 83 and 85 of the gauge block 17. The positioning surfaces 83 and 85 are easily identified because the marking surface 87 lies therebetween. The finger 95 is then caused to engage one of the discs 47 and the pack 21 is rotated utilizing the handle 79 or the plate 67. The remaining recording discs 47 can be checked by repositioning the finger 95 on the various pivot pins 97 in a conventional manner.

The tester 11 is portable and can be easily disassembled and transported within a suitable carrying case. The runout gauge 19 is not attached to the test stand 25 and is therefore easily removed therefrom. Similarly, the spindle 15 can be removed from the plate member 25 by unfastening the threaded fasteners 37. The plate member 67 can merely be lifted off of the cover bezel 65 and the lock 57.

FIG. 5 illustrates a field pack tester 101 which is identical to the field pack tester 11 except that the runout gauge thereof is movably mounted on the test stand. Specifically, the field pack tester 101 includes a test stand 103 which is substantially identical to the test stand 13 and which has a plate member 105. A disc pack 107 is mounted for rotation on the plate member 105 as described above in connection with the embodiment of FIGS. 1–4.

The field pack tester 101 differs from the field pack tester 11 in that the former has a pivotally mounted supported member 109 in lieu of a gauge block. The support member 109 is a small plate-like member having a projection or pin 111 depending therefrom and being rotatably received within a corresponding recess or aperture in the plate member 105. A runout gauge 13, which may be identical to the runout gauge 19 is rigidly mounted on the support member 109 for pivotal movement therewith.

The support member 109 and the runout gauge 113 can be pivoted between an operable position shown in full lines in FIG. 5 in which the runout gauge 15 can contact the surfaces of the disc to measure the runout thereof and an inoperative position shown in dashed lines in FIG. 5 in which the runout gauge will not interfere with mounting the disc pack 107 on, or removing the disc pack 107 from, the spindle. Suitable stops 115 and 117 on the plate member 105 engage the support member 109 in the operative and inoperative positions, respectively, to fix such positions. If desired, detents may be provided for releasably retaining the runout gauge 113 and the support member 109 in each of the positions thereof.

The primary advantage of the embodiment of FIG. 5 is that the runout gauge, being fixedly secured to the support member 109, is not subject to being inadvertently knocked into damaging contact with the disc pack 107. To facilitate transportation of the field pack tester 101, however, the runout gauge 113 should be releasably affixed to the support member 109 and/or the support member 109 should be releasably mounted on the plate member 105. In the embodiment illustrated, the runout gauge 113 is rigidly affixed to the support member 109 and the pin 111 is retained in the cooperating aperture of the plate member 105 only by the weight of the runout gauge and of the support member. Thus, the runout gauge 113, the support member 109, and the pin 111 can be removed as a unit from the plate member 105.

It should be noted that the support member 109 is a relatively thin member and lies appreciably beneath the lowermost portion of the disc pack 107, and therefore does not interfere with the mounting or removal of the disc pack from the field pack tester. The support member 109 and the stop 115 perform the same function as the gauge block 117 in that they position the runout gauge on the test stand at a predetermined position relative to the disc pack to allow the runout gauge to properly conduct the runout test.

Although exemplary embodiments of the invention have been shown and described, many changes, modifications, and substitutions may be made by one having ordinary skill in the art without necessarily departing from the spirit and scope of this invention.

We claim:

1. In a field pack tester supportable on a supporting surface and usable to test a disc pack having at least one recording disc, the combination of:

a rigid test stand supportable on the supporting surface, said test stand having a plate member supportable in a generally horizontal plane by the supporting surface, said plate member having an aperture therein;

a spindle mounted in said aperture in said plate member of said test stand for supporting the disc pack for rotation about a generally vertical rotational axis;

means for attaching said spindle to said plate member;

a gauge block rigidly attached to said plate member of said test stand adjacent said spindle, said gauge block having a positioning surface thereon; and a runout gauge having a positioning surface thereon, said runout gauge being positionable on said plate member with the positioning surface thereof in contact with the positioning surface of said gauge block, said runout gauge including follower means for engaging a surface of the disc when said positioning surfaces are in engagement to measure the runout of the disc, said runout gauge being unattached to either of said gauge block or said test stand whereby said runout gauge can be easily removed from said test stand.

2. In a portable field pack tester supportable on a surface and usable to test a disc pack having at least one recording disc, the combination of:

a rigid portable test stand supportable on the supporting surface, said test stand having a plate member supportable in a generally horizontal plane by the supporting surface;

a spindle for supporting the disc pack for rotation about a generally vertical rotational axis;

means for mounting said spindle on said plate member;

a supporting member;

means for mounting said supporting member on said plate member for movement between a first position and a second position, said last mentioned means including a projection on one of said members and a cooperating recess in the other of said members for receiving said projection, said projection being easily removable from said recess; and a runout gauge mounted on said supporting member for movement therewith between said positions and having follower means for engaging a surface of the disc when said supporting member is in said first position, said runout gauge being moved away from said spindle in said second position to facilitate positioning of the disc pack on said spindle.

3. In a field pack tester for testing a disc pack having at least one recording disc, the combination of:

a rigid test stand;

spindle means for mounting the disc pack for rotation;

means for mounting the spindle means on said test stand;

a runout gauge including follower means for contacting the surface of the recording disc for measuring the runout thereof while the disc pack is being rotated on said spindle means;

means for positioning the runout gauge on the test stand at a predetermined position relative to the disc pack to allow said follower means to contact the surface of the disc;

means attachable to the disc pack to facilitate manual rotation of the disc pack on said spindle means while the follower means is contacting the surface of the disc; and said means for mounting said runout gauge including a gauge block rigidly mounted on said test stand adjacent said spindle means, said runout gauge being positionable relative to the disc pack by engaging said runout gauge and said gauge block, said runout gauge being removable from said test stand.

4. A portable field pack tester for testing a disc pack having at least one recording disc comprising:

a spindle for supporting the disc pack for rotation about a rotational axis;

first means for supporting the spindle so that said rotational axis is generally vertical;

a gauge having a positioning surface thereon;

second means for defining a positioning shoulder, said positioning shoulder being spaced a predetermined distance from said rotational axis;

third means for defining a supporting surface adjacent said positioning shoulder for supporting said gauge;

said gauge being movable to an operative position in which said gauge is supported by said supporting surface and said positioning surface engages the positioning shoulder, said positioning shoulder limiting movement of the gauge toward the disc pack to thereby prevent harmful contact between the gauge and the disc pack as the disc pack rotates about said rotational axis; and said gauge including follower means for engaging a surface of the recording disc when said gauge is in said operative position when the disc pack is rotating about said rotational axis to measure the runout of the disc, said gauge being movable away from the disc pack to facilitate removal of the disc pack from the spindle.

5. A field pack tester as defined in claim 4 wherein said gauge includes a notch therein, said notch loosely receiving a peripheral portion of the recording disc in said operative position.

6. A field pack tester as defined in claim 4 wherein said gauge is unattached to said third means and can be easily removed from said supporting surface.

7. A field pack tester as defined in claim 6 wherein said gauge includes a notch therein, said notch loosely receiving a peripheral portion of the recording disc in said operative position, said first means includes a plate member.

8. A field pack tester as defined in claim 4 wherein said gauge includes an upright member having said positioning surface thereon and said follower means is pivotally and removably mounted on said upright member, said upright member and said follower means being movable away from the disc pack.

9. A portable field pack tester for testing a disc pack having at least one recording disc comprising:

a spindle for supporting the disc pack for rotation about a rotational axis;

first means for supporting the spindle so that said rotational axis is generally vertical;

a gauge having a positioning surface thereon;

second means for defining a positioning shoulder, said positioning shoulder being spaced a predetermined distance from said rotational axis;

third means for defining a supporting surface adjacent said positioning shoulder for supporting said gauge;

said gauge being manually movable to an operative position in which said gauge is supported by said supportinng surface and said positioning surface engages the positioning shoulder, said positioning shoulder limiting movement of the gauge toward the disc pack to thereby prevent harmful contact between the gauge and the disc pack when the disc pack is rotating about said rotational axis; and said gauge including an upright member having a notch therein for loosely receiving a peripheral portion of the disc when said gauge is in said operative position, said gauge being removable from the supporting surface.

References Cited

UNITED STATES PATENTS

| | | | |
|---|---|---|---|
| 3,199,204 | 8/1965 | Green | 33—174 |
| 2,929,147 | 3/1960 | Hall | 33—174 |
| 2,366,394 | 1/1945 | Gerber | 33—174 |
| 2,568,817 | 9/1951 | Moss. | |
| 2,858,615 | 11/1958 | Aller. | |

FOREIGN PATENTS

| | | |
|---|---|---|
| 887,651 | 11/1943 | France. |

SAMUEL S. MATTHEWS, Primary Examiner